United States Patent [19]
Welcher

[11] Patent Number: 5,941,016
[45] Date of Patent: Aug. 24, 1999

[54] SPORTING GAME COUNTING RECEPTACLE

[76] Inventor: William J. Welcher, 6288 Textile, Ypsilanti, Mich. 48197

[21] Appl. No.: 08/890,502

[22] Filed: Jul. 9, 1997

[51] Int. Cl.⁶ .................................................. A01K 97/00
[52] U.S. Cl. ................................................ 43/55; 220/323
[58] Field of Search ............................... 43/55; 220/323, 220/326, 915.1, 915.2

[56] References Cited

U.S. PATENT DOCUMENTS

| | | | |
|---|---|---|---|
| 752,600 | 2/1904 | Sinclair . | |
| 1,489,255 | 4/1924 | Lane . | |
| 4,008,540 | 2/1977 | Brower | 43/55 |
| 4,845,886 | 7/1989 | Robinson | 43/55 |
| 4,965,955 | 10/1990 | Campbell et al. | 43/4 |
| 5,156,291 | 10/1992 | Mielke | 220/254 |
| 5,388,547 | 2/1995 | Lehr et al. | 116/222 |
| 5,699,900 | 12/1997 | Artis | 206/5.1 |

*Primary Examiner*—Jack W. Lavinder
*Attorney, Agent, or Firm*—Young & Basile, P.C.

[57] ABSTRACT

A sporting game counting receptacle for retaining and maintaining a running count of captured game. The present invention provides a receptacle having an opening therein wherein a door is connected to the receptacle for movement between a closed position, wherein the door provides closure of the opening, and an open position, wherein a passageway is formed through the opening and into the receptacle. The door is biased toward the closed position and operatively connected to a counter wherein movement of the door from the closed position to the open position indexes the counter to provide a running count of the game placed in the receptacle. The receptacle may comprise an insulated cooler, a live well or any receptacle capable of holding captured game.

20 Claims, 2 Drawing Sheets

SPORTING GAME COUNTING RECEPTACLE

The invention relates to a receptacle for retaining captured sporting game, and in particular, a receptacle having a hinged door responsive to a counter for counting the number of game placed in the receptacle.

BACKGROUND OF THE INVENTION

Typically, gaming laws limit and restrict the numbers of sporting game a sportsman may bag or obtain under a particular sporting game license. The sportsman is responsible for maintaining the number or quantity of sporting game he has bagged during a particular hunt or outing, and if the sportsman exceeds the bagging limit, the sportsman may be liable for violations of the gaming laws.

Keeping track of the number of game bagged is usually not a problem for larger game wherein the bag limits typically range between 1 or 2 animals. The gaming laws, with regard to smaller game, may allow for a plurality of game to be bagged, and therefore, keeping track of the number of game bagged may become more difficult. The problem is amplified when several sportsmen utilize a common means for retaining their game during the same outing or hunt.

The gaming laws, as they apply to fishing, typically allow a fisherman to catch a plurality of fish under a fishing license. Fishermen often fish together and share a common means for holding and retaining the fish caught until the outing is completed.

When a fish is caught, a fisherman's hands are typically occupied with a fishing rod in one hand and the fish in the other. The fisherman does not have a free hand by which to open the holding receptacle nor does the fisherman have an opportunity to count or keep track of the quantity of fish held in the receptacle. The addition of several fishermen sharing the same fish holding receptacle eliminates the practicality of having fishermen maintain an accurate running count of the fish caught and placed in the receptacle.

SUMMARY OF THE INVENTION

The present invention solves the above-mentioned shortcomings by providing a sporting game counting receptacle for retaining and counting captured sporting game placed in a holding receptacle. The present invention provides a receptacle having an opening therein and a door pivotally connected to the receptacle wherein the door moves between a closed position, wherein the door provides closure of the opening, and an open position, wherein a passageway is formed through said opening and into the receptacle. A counter is operatively connected to the door wherein the counter responds to the door moving from the closed position to the open position to maintain a running count of the sporting game placed in the receptacle. The receptacle may take the form of an insulated cooler, a live well or any receptacle suitable for retaining captured sporting game.

To this end, the objects of the present invention are to provide a new and improved sporting game counting receptacle for retaining and maintaining an accurate running count of the number of sporting game placed in the holding receptacle.

BRIEF DESCRIPTION OF THE DRAWINGS

The various and other uses of the present invention will become more apparent by referring to the following detailed descriptions and drawings in which.

DESCRIPTION OF THE PREFERRED EMBODIMENT

Figure 1:
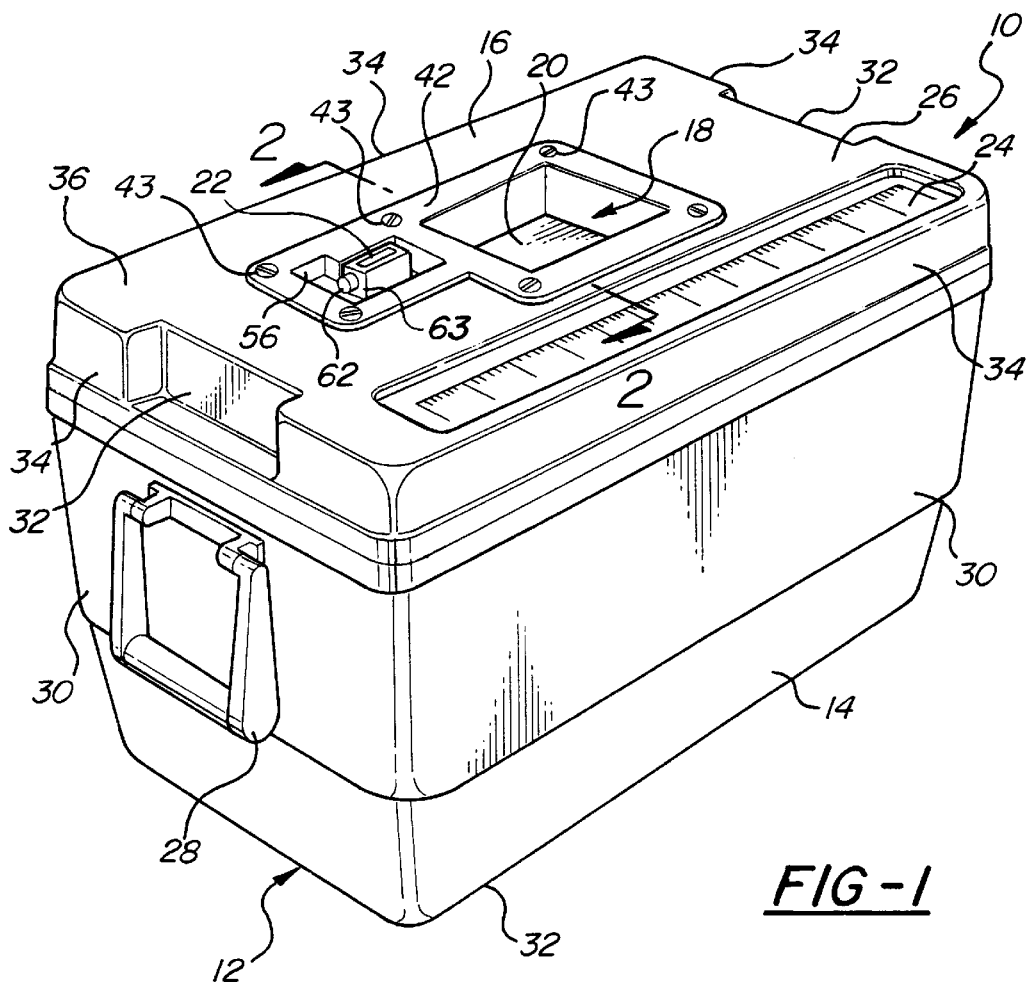
FIG. 1 is a perspective view showing the sporting game counting receptacle described therein as the invention.

FIG. 1 shows a sporting game counting receptacle 10 as defined by the present invention. Although the present invention may be utilized in conjunction with a variety of sporting game, the present invention is best suited for the retention, counting and holding of fish. Therefore, the remainder of the detailed description will refer to and reference the present invention in conjunction with fish, although it is to be understood that the present invention may be utilized in conjunction with a variety of different sporting game.

As seen in FIG. 1, an insulated cooler 12 may be provided as a retainer to the sporting game counting receptacle 10. The insulated cooler 12 has a base portion 14 and a lid 16 wherein an opening 18 is provided through the lid 16. A door 20 provides closure to the opening 18, and a counter 22 is responsive to the opening and closing of the door 20. A measuring scale 24 is provided on the top surface 26 of the lid 16 to provide for a quick and accessible measurement of the length of a captured fish 69. Pivoting handles 28 (only one shown) are provided on opposite side walls 30 of the base portion 14 of the cooler 12, and corresponding recesses 32 are provided on opposite side walls 34 of the lid 16 to allow a fisherman's hands (not shown) to wrap around the handles 28 and lift the cooler 12 without engaging the lid 16 of the cooler 12 or being pinched between the base portion 14 and the lid 16 of the cooler 12.

Figure 4:
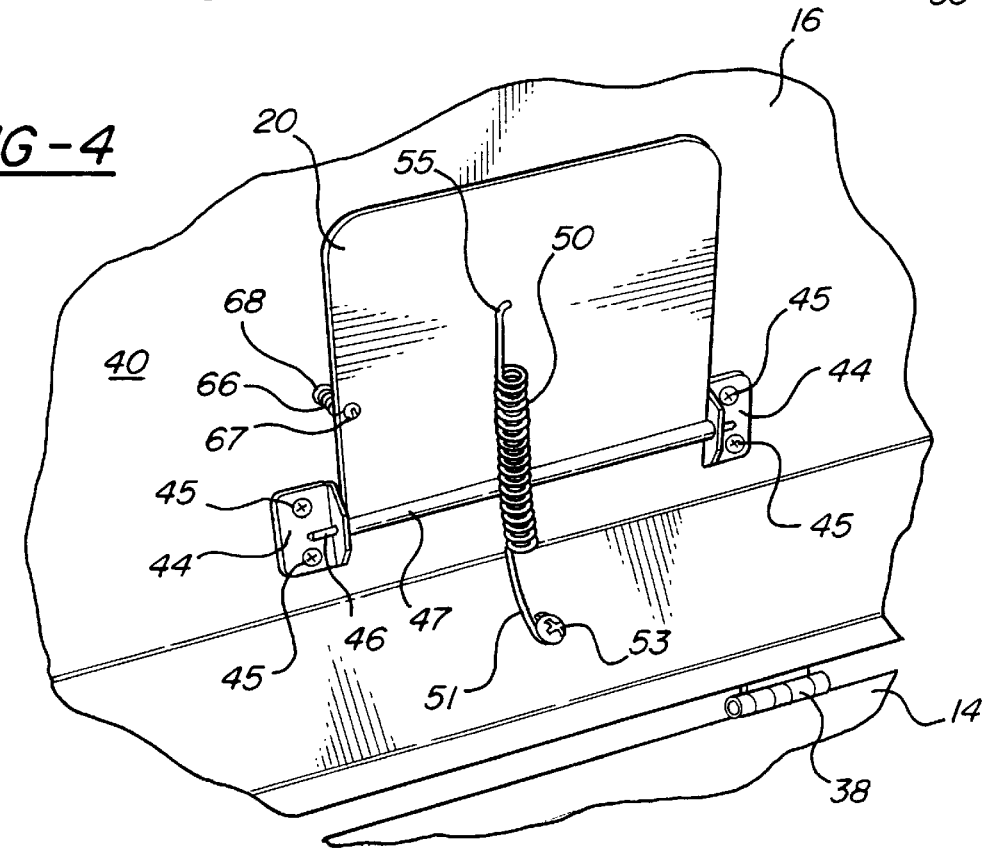
FIG. 4 is a partial perspective view of the underside of the door in the closed position.

To provide an enclosure, the base portion 14 of the cooler 12 has four of the side walls 30 and a bottom wall or floor 32 substantially perpendicular to the side walls 30. The lid 16 of the cooler 12 also has four of the side walls 34 and a top wall 36 which is substantially perpendicular to the side walls 34. The lid 16 is pivotally connected to one of the side walls 30 of the base portion 14 via a pair of hinges 38 (only one shown), as seen in FIG. 4. The hinges 38 provide pivotal movement of the lid 16 with respect to the base portion 14 wherein the lid 16 moves between a closed position, wherein the cooler 12 is enclosed, and an open position, wherein access is provided across the entire length and width of the cooler 12.

Figure 2:
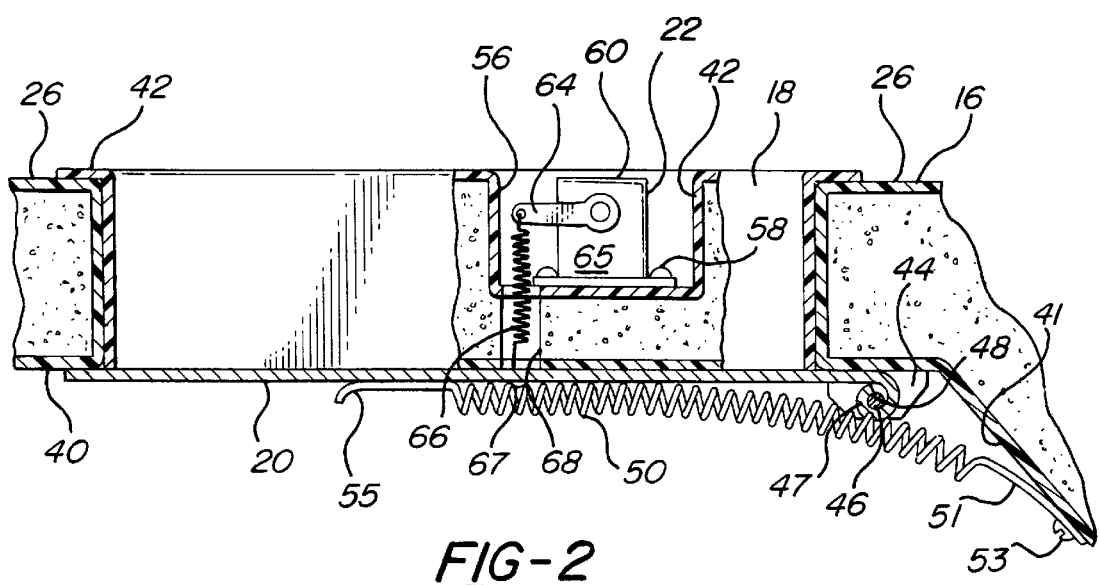
FIG. 2 is a cross-sectional view taken in the direction of arrows 2—2 in FIG. 1 showing the door in the closed position.
Figure 3:
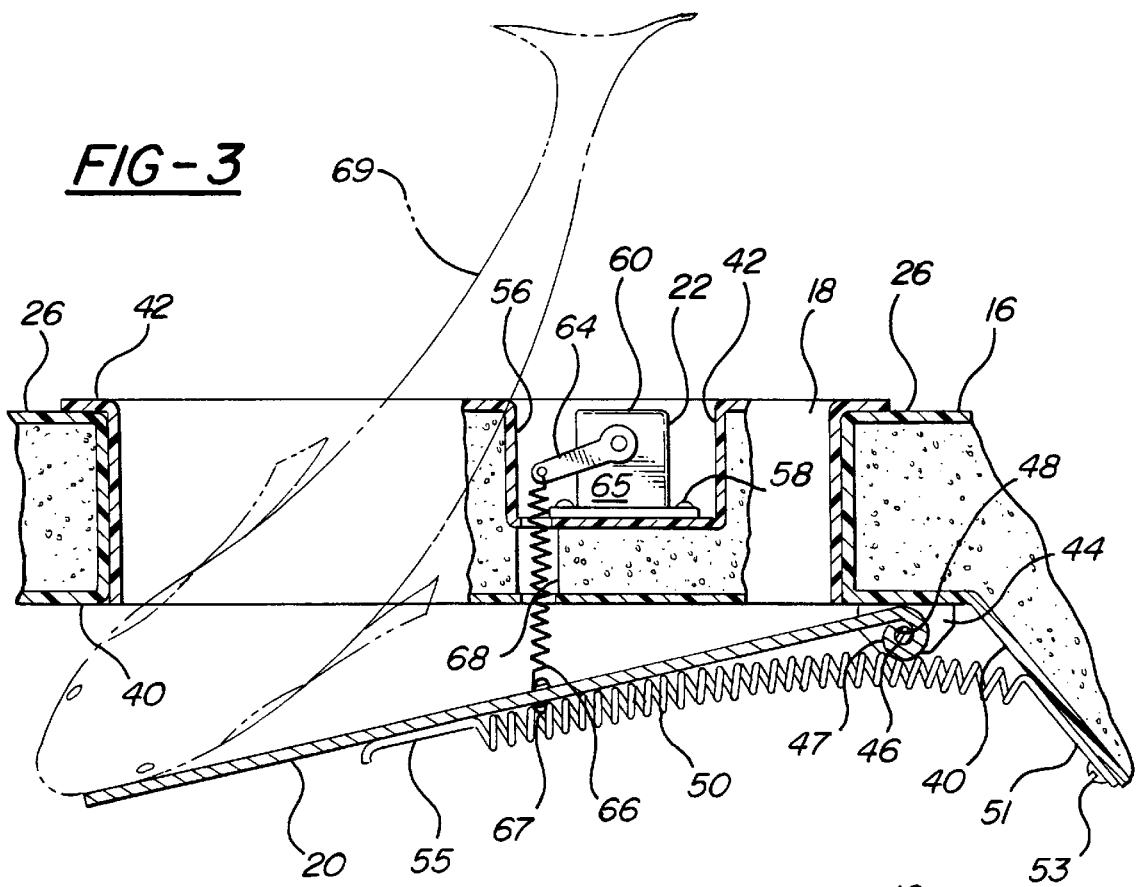
FIG. 3 is a cross-sectional view taken in the direction of arrows 3—3 in FIG. 1 showing the door in the open position.

In order to provide closure of the opening 18 in the lid 16 of the cooler 12, the opening 18 has a rectangular shape extending through the top surface 26 and bottom surface 40 of the lid 16, as seen in FIGS. 1–3. A plastic frame or molding 42 is secured to the lid 16 by fasteners 43, and the molding 42 outlines the portions of the lid 16 which define the opening 18. As seen in FIGS. 2–4, the door 20 is pivotally connected to the bottom surface or underside 40 of the lid 16 via a pair of brackets 44 connected to the underside 40 of the lid 16 by fasteners 45. One end 47 of the door 20 is rolled over on to the door 20 to form a cylindrical aperture 48 extending along the length of the door 20. A pin 46 extends through the cylindrical aperture 48 of the door and through a pair of apertures provided in each of the brackets 44. A torsional spring 50 biases the door 20 against the underside 40 of the lid 16 by having one of its ends 51 connected to the underside 40 of the lid 16 by a fastener 53 and its other end 55 engaging a central portion of the door 20. The door 20 has a perimeter slightly larger than the perimeter of the opening 18 so that the door 20 abuts the underside 40 of the lid 16 to provide closure of the opening 18.

In order to maintain a running count of the fish placed in the cooler 12, the door 20 is operatively connected to the counter 22. The plastic frame or molding 42 also outlines and defines a recess 56 in the top surface 26 of the lid 16, as seen in FIGS. 1–3. The counter 22 is seated within the recess 56 in the top surface 26 of the lid 16, and the counter 22 is connected to the lid 16 through fasteners 58. The recess 56 allows the top surface 60 of the counter 22 to be substantially flush with the top surface 26 of the lid 16 in order to reduce the chance that the counter 22 may be damaged. The top surface 60 of the counter 22 displays a numerical number which may be reset by a knob or dial 62 extending from a side 63 of the counter 22. The counter is an indexing type of counter 22 wherein the counter 22 advances one numerical number each time the counter 22 is actuated.

As seen in FIGS. 2–4, the counter 22 provides a lever arm 64 pivotally connected to another side 65 of the counter 22. A tension spring 66 has one end connected to the end of the lever arm 64 and the opposite end connected to the door 20 by a fastener 67. The tension spring 66 extends through an aperture 68 provided in the lid 16. The lever 64 pivots between a first position, as seen in FIG. 2, and a second position, as seen in FIG. 3, wherein the lever arm 64 indexes the counter 22 when moving from the first position to the second position. The counter 22 does not index when the lever arm 64 moves from the second position to the first position, but rather, the lever arm 64 resets to index the counter 22 again when the lever arm 64 repeats its movement from the first position to the second position.

In operation, the door 20 is biased in the closed position so that the opening 18 is closed and the lever arm 64 is in the first position, as seen in FIG. 2. When a fisherman catches a fish 69, the fish 69 is removed from the hook (not shown) and placed into the opening 18 of the lid 16. The weight of the fish 69 forces the door 20 downward toward the open position, and when the door 20 opens and creates a large enough passageway for the fish 69, the fish 69 passes through the opening 18 of the lid 16 and into the enclosure defined by the base portion 14 of the cooler 12. When the door 20 is displaced to the open position, the tension spring 66 biases the lever arm 64 towards the second position causing the counter 22 to index one step or advance by one numerical number. Once the fish 69 passes through the opening 18 and clears the door 20, the door 20 biases back to the closed position, and the lever arm 64 returns to the first position. Further placement of fish 69 through the opening 18 and into the cooler 12 will allow the counter 22 to maintain a running count as to the number of fish 69 contained in the cooler 12.

It should be noted that the receptacle of the present invention is not limited to an insulated cooler 12, but rather, the present invention may be utilized with a live well or any other type of container which may be utilized to retain captured game.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A sporting game counting receptacle for retaining captured game comprising:

a receptacle having an opening therein;

a door connected to said receptacle, and said door moving between a closed position, wherein said door provides closure of said opening, and an open position, wherein a passageway is formed through said opening; and a means for operatively connecting a counter to said door wherein said counter responds to said door moving from said closed position to said open position.

2. The sporting game counting receptacle as stated in claim 1, wherein said receptacle comprises:

an insulated cooler.

3. The sporting game receptacle as stated in claim 1, wherein said receptacle comprises:

a live well.

4. The sporting game counting receptacle as stated in claim 1, further comprising:

said door pivotally connected to said receptacle.

5. The sporting game counting receptacle as stated in claim 1, further comprising:

means for biasing said door toward said closed position.

6. The sporting game counting receptacle as stated in claim 5, wherein said biasing means comprises:

a torsional spring having opposite ends wherein one end is connected to said door and the other end is connected to said receptacle.

7. The sporting game counting receptacle as stated in claim 1, further comprising:

said counter connected to said receptacle.

8. A sporting game counting receptacle for retaining captured game comprising:

a receptacle having an opening therein;

a door connected to said receptacle, and said door moving between a closed position, wherein said door provides closure of said opening, and an open position, wherein a passageway is formed through said opening;

a counter operatively connected to said door wherein said counter responds to said door moving from said closed position to said open position;

said counter having a lever arm, and said lever arm moving between a first position and a second position wherein said counter indexes when said lever arm moves from said first position to said second position; and means for coupling said lever arm to said door wherein said coupling means causes said lever arm to move between said first position and said second position in response to said door moving between said closed position and said open position.

9. The sporting game counting receptacle as stated in claim 8, wherein said coupling means comprises:

a tension spring having opposite ends wherein one of said opposite ends is connected to said lever arm and the other end is connected to said door.

10. A sporting game counting receptacle for retaining captured game comprising:

a receptacle having an opening therein;

a door pivotally connected to said receptacle, and said door pivoting between a closed position, wherein said door provides closure of said opening to said receptacle, and an open position, wherein a passageway is formed through said opening and into said receptacle;

means for biasing said door toward said closed position;

an indexing counter connected to said receptacle; and a lever arm having one end operatively connected to said counter and its other end operatively connected to said door wherein said counter indexes in response to movement of said door from said closed position to said open position.

11. The sporting game counting receptacle as stated in claim 10, wherein said receptacle comprises:

an insulated cooler.

12. The sporting game counting receptacle as stated in claim 10, wherein said receptacle comprises:

a live well.

13. The sporting game counting receptacle as stated in claim 10, wherein said biasing means comprises:

a torsional spring having opposite ends wherein one of said opposite ends is connected to said door and the other of said opposite ends is connected to said receptacle.

14. The sporting game counting receptacle as stated in claim 10, further comprising:

said receptacle having an exterior surface and a recess in said exterior surface for receiving said counter wherein said counter is connected to said receptacle and substantially flush with said exterior surface of said receptacle.

15. The sporting game counting receptacle as stated in claim 10, further comprising:

said door pivotally connected to an inside surface of said receptacle, and said door overlapping and abutting portions of said receptacle that define said opening when said door is in said closed position.

16. A sporting game counting receptacle for retaining captured game comprising:

a receptacle having an opening therein;

a door pivotally connected to said receptacle, and said door pivoting between a closed position, wherein said door provides closure of said opening to said receptacle, and an open position, wherein a passageway is formed through said opening and into said receptacle;

means for biasing said door toward said closed position;

an indexing counter operatively connected to said door wherein said counter indexes and responds to movement of said door from said closed position to said open position;

said counter having a lever arm, and said lever arm moving between a first position and a second position wherein said counter indexes when said lever arm moves from said first position to said second position; and means for coupling said lever arm to said door wherein said coupling means causes said lever arm to move between said first position and said second position in response to said door moving between said closed position and said open position.

17. The sporting game counting receptacle as stated in claim 16, wherein said coupling means comprises:

a tension spring having opposite ends wherein one of said opposite ends is connected to said lever arm and the other end is connected to said door.

18. A sporting game counting receptacle for retaining captured game comprising:

a receptacle having an exterior surface, an interior surface, and an opening therein;

a door pivotally connected to said inside surface of said receptacle, and said door pivoting between a closed position, wherein said door overlaps and abuts portions of said receptacle that define said opening to provide closure of said opening, and an open position, wherein a passageway is formed through said opening and into said receptacle;

a torsional spring having opposite ends with one end connected to said door and the other end connected to said receptacle;

an indexing counter mounted in a recess formed in said exterior surface of said receptacle wherein said indexing counter is substantially flush with said exterior surface of said receptacle;

said indexing counter having a lever arm pivotally connected thereto, and said lever arm pivoting between a first position and a second position wherein said indexing counter indexes in response to said lever arm pivoting from said first position to said second position; and a tension spring extending through an aperture provided in said receptacle, and said tension spring having opposite ends wherein one of said opposite ends is connected to said lever arm and the other end is connected to said door.

19. The sporting game counting receptacle as stated in claim 18, wherein said receptacle comprises:

an insulated cooler.

20. The sporting game counting receptacle as stated in claim 18, wherein said receptacle comprises:

a live well.

* * * * *